United States Patent
Gross

(10) Patent No.: US 9,537,188 B2
(45) Date of Patent: Jan. 3, 2017

(54) TEMPERATURE CONTROL DEVICE

(71) Applicant: Dr. Ing. h.c. F. Porsche Aktiengesellschaft, Stuttgart (DE)

(72) Inventor: Manuel Gross, Besigheim (DE)

(73) Assignee: Dr. Ing h.c.F. Porsche Aktiengesellschaft, Stuttgart (DE)

(*) Notice: Subject to any disclaimer, the term of this patent is extended or adjusted under 35 U.S.C. 154(b) by 288 days.

(21) Appl. No.: 14/220,371

(22) Filed: Mar. 20, 2014

(65) Prior Publication Data

US 2014/0287293 A1  Sep. 25, 2014

(30) Foreign Application Priority Data

Mar. 20, 2013 (DE) .................. 10 2013 102 867

(51) Int. Cl.
| | | |
|---|---|---|
| *H01M 10/65* | (2014.01) | |
| *H01M 2/10* | (2006.01) | |
| *H05B 3/20* | (2006.01) | |
| *H01M 10/6571* | (2014.01) | |
| *H01M 10/625* | (2014.01) | |
| *H01M 10/615* | (2014.01) | |
| *H01M 10/653* | (2014.01) | |
| *H01M 10/6555* | (2014.01) | |
| *H01M 10/6554* | (2014.01) | |
| *H01M 10/613* | (2014.01) | |

(52) U.S. Cl.
CPC ....... *H01M 10/5083* (2013.01); *H01M 10/613* (2015.04); *H01M 10/615* (2015.04); *H01M 10/625* (2015.04); *H01M 10/653* (2015.04); *H01M 10/6554* (2015.04); *H01M 10/6555* (2015.04); *H01M 10/6571* (2015.04); *H05B 3/20* (2013.01); *H01M 2/1077* (2013.01); *H01M 2220/20* (2013.01); *H05B 2203/013* (2013.01); *H05B 2203/02* (2013.01)

(58) Field of Classification Search
CPC .............. H01M 10/5083; H01M 10/60; H01M 10/6571; H01M 10/653; H01M 10/6555; H01M 2/10; H01M 2/34; H05B 3/00
See application file for complete search history.

(56) References Cited

U.S. PATENT DOCUMENTS

| | | | | |
|---|---|---|---|---|
| 3,413,150 A | * | 11/1968 | Kummer | H01M 10/3909 |
| | | | | 429/104 |
| 3,428,493 A | * | 2/1969 | Adams | H01M 10/399 |
| | | | | 429/112 |

(Continued)

FOREIGN PATENT DOCUMENTS

| | | |
|---|---|---|
| AT | 511 117 | 9/2012 |
| DE | 203 19 024 | 3/2004 |

(Continued)

OTHER PUBLICATIONS

German Search Report of Nov. 12, 2013.

*Primary Examiner* — Kenneth Douyette
(74) *Attorney, Agent, or Firm* — Gerald E. Hespos; Michael J. Porco; Matthew T. Hespos

(57) ABSTRACT

A temperature control device for heating or cooling a battery has a cooling apparatus (5) and an electric heating apparatus (10). To simplify the temperature control of batteries, in particular of high-voltage batteries or traction batteries, the electric heating apparatus (10) is combined in one component with a highly thermally conductive material (20).

9 Claims, 1 Drawing Sheet

(56) References Cited

U.S. PATENT DOCUMENTS

| | | | |
|---|---|---|---|
| 3,649,366 A * | 3/1972 | Jordan | H01M 10/625 |
| | | | 219/209 |
| 5,158,841 A | 10/1992 | Mennicke et al. | |
| 2007/0182418 A1 | 8/2007 | Reynier et al. | |
| 2010/0151307 A1 | 6/2010 | Naganuma | |
| 2010/0151309 A1 | 6/2010 | Marukawa et al. | |
| 2011/0003185 A1 | 1/2011 | Kritzer | |
| 2011/0117463 A1 | 5/2011 | Lienkamp et al. | |
| 2011/0240751 A1 | 10/2011 | Rauh et al. | |
| 2011/0318628 A1 | 12/2011 | Heim | |
| 2012/0129020 A1 | 5/2012 | Lachenmeier et al. | |
| 2012/0219839 A1 | 8/2012 | Kritzer et al. | |
| 2013/0183565 A1 | 7/2013 | Zahn | |
| 2014/0050964 A1 | 2/2014 | Koeroesi et al. | |

FOREIGN PATENT DOCUMENTS

| | | |
|---|---|---|
| DE | 10 2009 005 853 | 7/2010 |
| DE | 20 2010 016 259 | 3/2011 |
| DE | 10 2010 051 132 | 6/2011 |
| DE | 10 2010 001 430 | 8/2011 |
| DE | 10 2010 038 781 | 2/2012 |
| DE | 10 2011 014 516 | 5/2012 |
| KR | 20120053596 | 5/2012 |
| KR | 20120099461 | 9/2012 |
| WO | 2012019740 | 2/2012 |
| WO | 2012/153230 | 11/2012 |

\* cited by examiner

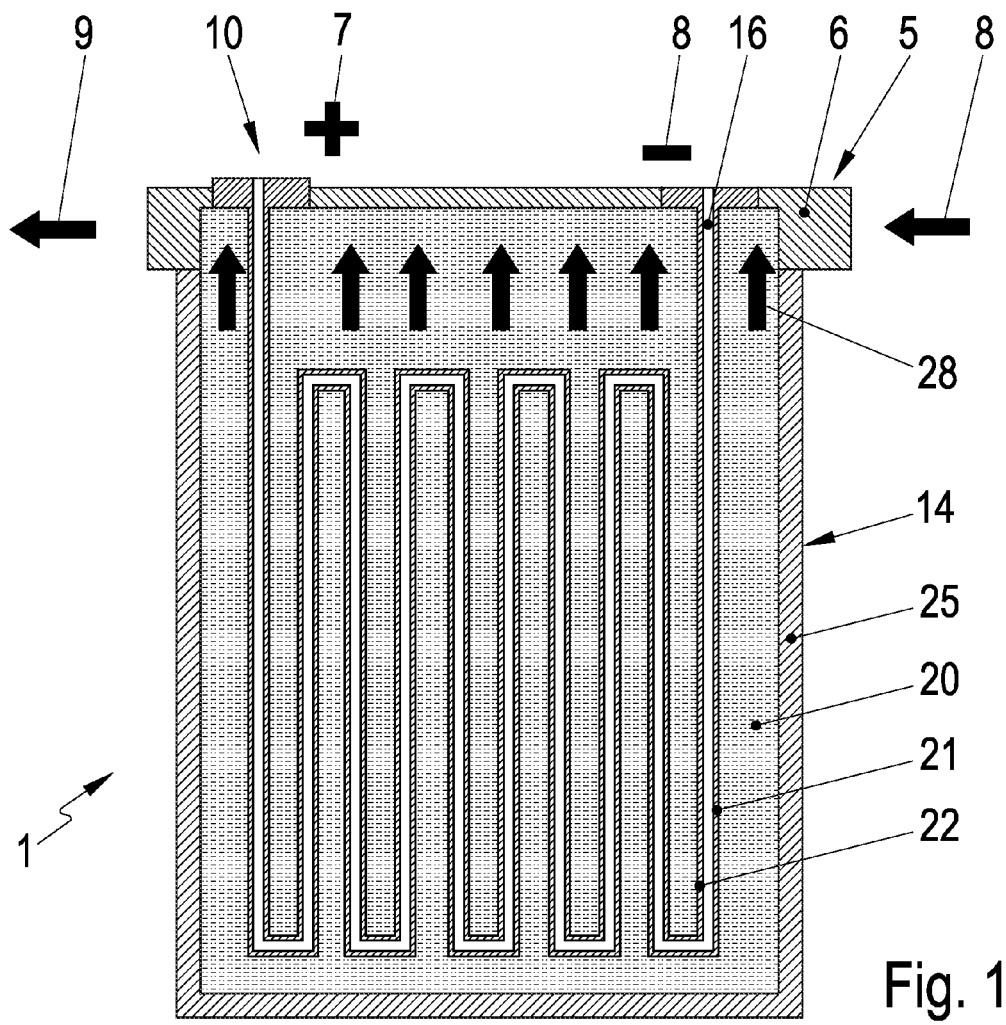
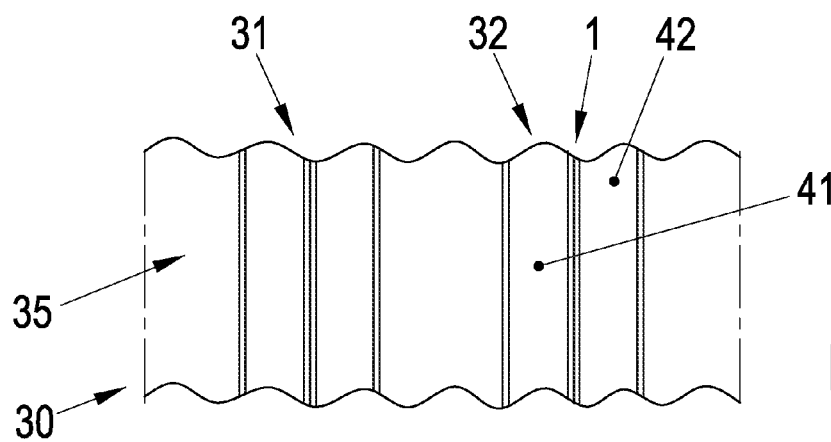

TEMPERATURE CONTROL DEVICE

CROSS REFERENCE TO RELATED APPLICATION

This application claims priority under 35 USC 119 to German Patent Appl. No. 10 2013 102 867.5 filed on Mar. 20, 2013, the entire disclosure of which is incorporated herein by reference.

BACKGROUND

1. Field of the Invention

The invention relates to a temperature control device having a cooling apparatus for cooling a battery and an electric heating apparatus for heating a battery. The invention also relates to a battery, in particular to a high-voltage battery or traction battery, having a multiplicity of such temperature control devices.

2. Description of the Related Art

Published US Patent Application Pub. No. US 2011/0318628 A1 discloses a cooling apparatus for a battery that has a first region with air cooling, a separate second region with liquid cooling, and a third region with an electric heating apparatus. U.S. Pat. No. 5,158,841 discloses a high-temperature storage battery with thermal insulation and direct or indirect cooling apparatuses and heating elements arranged in the thermal insulation to cool and heat storage cells.

The object of the invention is to simplify the temperature control of batteries, in particular of high-voltage batteries or traction batteries.

SUMMARY OF THE INVENTION

The invention relates to a temperature control device that has an electric heating apparatus for heating a battery and a cooling apparatus for cooling the battery. The electric heating apparatus is combined in one component with a highly thermally conductive material. The cooling apparatus preferably is a fluid cooling means. Two components of the temperature control device, such as an electrical resistance heating film and a separate thermal distribution film, are combined with one another in a single component. As a result, the manufacture of a battery, such as a high-voltage battery or traction battery, with plural such temperature control devices, is simplified considerably.

The electric heating apparatus preferably is an electric resistance heater. The electric resistance heater may comprise at least one heating resistance element that converts electrical energy into thermal energy.

The electric heating apparatus preferably is an electric resistance heater with a positive temperature coefficient. The electric resistance heater with the positive temperature coefficient also is referred to as a PTC thermistor. PTC thermistors conduct electric current better at relatively low temperatures than at relatively high temperatures. The electrical resistance of a PTC thermistor increases as the temperature rises.

The electric heating apparatus may comprise an electric resistance heating conductor that is connected to the highly thermally conductive material with the intermediate connection of an electrical insulator. The electric resistance heating conductor advantageously is connected in a materially joined fashion to the electrical insulator. The highly thermally conductive material also advantageously is connected in a materially joined fashion to the electrical insulator.

The highly thermally conductive material preferably comprises graphite. Investigations carried out with the scope of the present invention have shown that graphite is particularly advantageous as a highly thermally conductive material.

The electric heating apparatus may be attached to an electrically insulating carrier material, and the electric heating apparatus advantageously is a printed circuit.

The electrically insulating carrier material may be a plastic film, such as a film formed from polyethylene terephthalate (PET).

The electric heating apparatus may be printed onto the electrically insulating carrier material, thereby simplifying the manufacture of the temperature control device.

The highly thermally conductive material of the temperature control device may be attached to the electrically insulating carrier material. For example, the highly thermally conductive material can be printed onto the electrically insulating carrier material. The temperature control device with the electric heating apparatus, the highly thermally conductive material and the electrically insulating carrier material advantageously may constitute a temperature control film.

The highly thermally conductive material preferably is connected in a thermally conductive fashion to the cooling apparatus. The cooling apparatus is advantageously is connected in a thermally conductive fashion to a multiplicity of film-like temperature control devices or temperature control films.

The invention also relates to a battery and preferably a high-voltage battery or traction battery having a multiplicity of the above-described temperature control devices. The individual temperature control devices can be manufactured cost-effectively and can be combined with different numbers of battery cells to form batteries of different sizes.

At least one temperature control device preferably is arranged between every two battery cells of the battery. The battery cells advantageously are bag-like battery cells, which also are referred to as coffee-bag cells or pouch cells.

The invention also relates to a motor vehicle having the above-described battery. The motor vehicle preferably is a hybrid vehicle which, in addition to an electric drive, also comprises a further drive, such as an internal combustion engine drive. However, the motor vehicle can also be a pure electric vehicle.

Further features of the invention can be found in the following description in which various exemplary embodiments are described with reference to the drawings.

BRIEF DESCRIPTION OF THE DRAWINGS

FIG. 1 is a simplified illustration of a temperature control device according to the invention.

FIG. 2 is a simplified illustration of a high-voltage battery with a temperature control device according to the invention.

DETAILED DESCRIPTION OF THE PREFERRED EMBODIMENTS

FIG. 1 illustrates in simplified form a temperature control device 1 according to the invention. The temperature control device 1 comprises a cooling apparatus 5, which is embodied as a cooling plate 6.

The temperature control device 1 also comprises an electric heating apparatus 10. Electrical terminals of the electric heating apparatus 10 are indicated by a plus symbol 7 and a minus symbol 8.

The temperature control device 1 also comprises an electrically insulating carrier material 14. The electrically insulating carrier material 14 advantageously is a plastic film, in particular a PET film.

The electric heating apparatus 10 is formed by printing an electric resistance heating conductor 16 onto the electrically insulating carrier material 14. The electric resistance heating conductor 16 has an essentially crenellated, meandering profile between the plus symbol 7 and the minus symbol 8.

In addition to the electric resistance heating conductor 16, a highly thermally conductive material 20 is attached to the electrically insulating material 14. The highly thermally conductive material 20 preferably is graphite.

The highly thermally conductive material 20 is separated from the electric resistance heating conductor by insulating strips 21, 22 made of the electrically insulating carrier material 14. Toward the outside, the highly thermally conductive material 20 is surrounded by a border 25 made of the electrically insulating carrier material 14.

The separation between the electric resistance heating conductor 16 and the highly thermally conductive material 20 can be achieved easily by virtue of the fact that the highly thermally conductive material 20 is attached to the electrically insulating carrier material 14 at a certain distance from the electric resistance heating conductor 16. No highly thermally conductive material 20 is arranged on the electrically insulating carrier material 14 in the vicinity of the border 25.

The highly thermally conductive material 20 is connected in a thermally conductive fashion to the cooling plate 6 in the region of the temperature control device 1 at the top in FIG. 1. As a result, heat conduction away via the highly thermally conductive material 20 is simplified considerably, as is indicated by arrows 28. Heat transported into the cooling apparatus 5 via the highly thermally conductive material 20 then is transported away via the fluid cooling means, as is indicated by the arrows 8 and 9.

FIG. 2 is a highly simplified illustration of a detail of a battery 30 with battery cell apparatuses 31, 32. The battery 30 is a high-voltage battery or traction battery of a motor vehicle.

The battery cell apparatuses 31 and 32 are accommodated in a carrying device 35. Each battery cell apparatus 31 and 32 has two battery cells 41, 42 in the form of bag-like battery cells, which are also referred to as coffee-bag cells or pouch cells.

A temperature control device 1, as illustrated in FIG. 1, is arranged between the two battery cells 41, 42 of a battery cell apparatus 31, 32, which also is referred to as a bi pack.

The two battery cells 41, 42 can be heated easily via the temperature control device 1. Furthermore, excess heat that occurs during operation of the battery cell apparatuses 31, 32 easily can be conducted away via the temperature control device 1.

What is claimed is:

1. A temperature control device for heating or cooling a battery, comprising:
   an electrically insulating carrier film having outer peripheral edges and a surface inward of the peripheral edges;
   an electric resistance heating conductor printed onto the surface of the electrically insulating carrier film and extending in a meandering pattern between first and second conductive terminals;
   a thermally conductive material attached to the surface of the electrically insulating carrier film at locations spaced from the electric resistance heating conductor by at least one insulating strip; and
   a cooling apparatus thermally connected to the thermally conductive material, wherein the electric resistance heating conductor enables selective heating of the battery and the thermally conductive material and the cooling apparatus dissipate excessive heat from the battery.

2. The temperature control device of claim 1, wherein the electric resistance heater has a positive temperature coefficient.

3. The temperature control device of claim 1, wherein the thermally conductive material comprises graphite.

4. The temperature control device of claim 1, wherein the electrically insulating carrier film is a plastic film.

5. The temperature control device of claim 1, wherein the thermally conductive material is printed on the surface of the electrically insulating carrier film.

6. A high-voltage battery or traction battery, comprising a multiplicity of the temperature control devices of claim 1.

7. The battery of claim 6, wherein at least one of the temperature control devices is arranged between two of the battery cells.

8. The temperature control device of claim 1, wherein the cooling apparatus is a cooling plate connected to the thermally conductive material in proximity to at least one of the outer peripheral edges of the electrically insulating carrier film.

9. The temperature control device of claim 1, wherein the at least one insulating strip is defined by the electrically insulating carrier film.

* * * * *